United States Patent
Guilford

[19]

[11] Patent Number: 6,158,799
[45] Date of Patent: Dec. 12, 2000

[54] SEAT POSITIONING METHOD AND APPARATUS

[76] Inventor: Phil Guilford, 26562 Stetson Pl., Laguna Hills, Calif. 92653

[21] Appl. No.: 09/421,432

[22] Filed: Oct. 19, 1999

Related U.S. Application Data

[63] Continuation-in-part of application No. 09/253,108, Feb. 19, 1999.
[60] Provisional application No. 60/103,799, Oct. 9, 1998, and provisional application No. 60/132,943, May 6, 1999.

[51] Int. Cl.$^7$ .................................................. B60H 2/02
[52] U.S. Cl. ................................. 296/65.01; 296/65.03; 296/65.05; 296/65.09
[58] Field of Search .................... 296/65.03, 65.05, 296/65.09, 65.16

[56] References Cited

U.S. PATENT DOCUMENTS

| | | | |
|---|---|---|---|
| 2,565,666 | 8/1951 | Schaefer | 296/65.09 |
| 4,484,776 | 11/1984 | Gokimoto et al. | 296/65.09 |
| 4,700,989 | 10/1987 | Ercilla | 296/65.03 |
| 5,230,544 | 7/1993 | Morritt et al. | 296/65.05 |
| 5,238,285 | 8/1993 | Holdampf et al. | 296/65.03 |
| 5,393,116 | 2/1995 | Bolsworth et al. | 296/65.03 |
| 5,516,180 | 5/1996 | Eavenson et al. | 296/65.05 |
| 5,593,208 | 1/1997 | Mitschelen et al. | 296/65.03 |
| 5,626,391 | 5/1997 | Miller et al. | 296/65.03 |
| 5,634,686 | 6/1997 | Okazaki | 296/65.03 |
| 5,662,368 | 9/1997 | Ito et al. | 296/65.05 |
| 5,810,416 | 9/1998 | Hashimoto | 296/65.05 |
| 6,000,742 | 12/1999 | Schaefer et al. | 296/65.09 |

*Primary Examiner*—Joseph D. Pape
*Assistant Examiner*—Kiran Patel
*Attorney, Agent, or Firm*—Fish & Associates, LLP; Robert D. Fish

[57] ABSTRACT

A bracket is used to maintain a unitary seat in a motor vehicle in a stowed position such that the rear of the seat is tilted upwards and the front of the seat is tilted downwards. Preferred brackets have a support arm attached to the bottom of the seat, and a floor brace that rests on the floor of the vehicle, and is pivotally coupled to the support arm at a pivot that is positioned no more than 12 inches from a closest point on the seat. Also in preferred brackets the floor brace has a slot, and the support arm and the floor brace are releasably coupled to each other via a connecting arm and a slidable connecting member positioned in the slot. A levered set screw may advantageously be employed to releasably couple the support arm and the floor brace.

13 Claims, 6 Drawing Sheets

SEAT POSITIONING METHOD AND APPARATUS

This application is a continuation-in-part of Ser. No. 09/253,108, filed Feb. 19, 1999, which claims priority to provisional application Ser. No. 60/103,799, filed Oct. 10, 1998, and further claims priority to provisional application Ser. No. 60/132,943, filed May 6, 1999.

FIELD OF THE INVENTION

The field of the invention is automotive aftermarket products.

BACKGROUND

In many motor vehicles at least one of the seats can be configured in either a riding position or a stowed (i.e. cargo) position. There are several known methods of stowing the seats, including a "fold-away" method employed in the Jeep™ Grand Cherokee™ and other sport utility vehicles.

In prior art FIG. 1, an exemplary fold-away seat configuration has a bottom cushion portion 220, a backrest portion 210, and an upper floor section 230. In moving the seat from a riding position to a stowed position, the bottom cushion portion 220 is pivoted from a substantially horizontal position to a substantially vertical position, and the backrest portion 210 is subsequently pivoted from a substantially vertical position to a substantially horizontal position. Depending on the specific configuration employed, the back of the backrest portion 210 may become flush with the top of the upper floor section 230 as shown, or rest on top of the seat support 230 (not shown). Similarly, the front of bottom cushion 220 may or may not juxtapose lower floor section 240.

Fold-away configurations have numerous advantages, but also some disadvantages. One disadvantage is that the bottom cushion portion 220 must be independently movable with respect to the backrest portion 210. Another disadvantage is that since the entire seat structure is typically bolted to the vehicle at the pivots, the seat cannot readily be removed from the vehicle.

In contrast to vehicles having two-piece, fold-away seat configurations, some vehicles provide seats having a unitary configuration, where the seat cushion portion and the backrest portion are coupled to one another more or less directly, rather than exclusively through the floor, frame, or other portion of the vehicle. It is of course known for the backrest portion of such seats to fold down, and it is also known for such seats to be entirely removable from the vehicle by ordinary users. But in general the manufacturers of such seats provide either no mechanism at all for maintaining the seat in a stowed position, or only an inadequate mechanism. In some model years of the Ford™ Expedition™ and Excursion™ and the Lincoln™ Navigator™, for example, the seats are not intended to be stowed at all, but are instead intended to be physically removed from the vehicle. This design feature ultimately provides more room in the vehicle for storage, but can be cumbersome and unappealing to consumers. In that case the manufacturer attempted to remedy the situation in the 2000 model year, but the method employed to hold the seat in the stowed position involves extends directly into the main body of the cargo space.

Priority application Ser. No. 09/253108, filed Feb. 19, 1999, which is incorporated herein in its entirety, discloses methods and apparatus in which a unitary type seat is placed in a stowed position such that the rear of the seat is tilted upwards, the front of the seat is tilted downwards, and the seat is maintained in the stowed position by a pivoting bracket coupling the seat to the floor near the front of the seat. In that application removable pins were employed is a preferred method of holding the bracket in a desired position. While that method proved to be quite effective, operation of the pins seems to have been somewhat difficult for some individuals.

There is still an ongoing need to provide a simpler and more effective means of maintaining unitary type seats in a stowed position.

SUMMARY OF THE INVENTION

The present invention is directed to methods and apparatus in which a unitary type seat of a motor vehicle is placed in a stowed position such that the rear of the seat is tilted upwards, the front of the seat is tilted downwards, and the seat is maintained in the stowed position by a pivoting seat bracket coupling the seat to the floor near the front of the seat. The bracket is secured in place using a digitally operable securing device, such as a pin, thumb screw, wing nut, or levered set screw.

Various objects, features, aspects, and advantages of the present invention will become more apparent from the following detailed description of preferred embodiments of the invention, along with the accompanying drawings in which like numerals represent like components.

DETAILED DESCRIPTION

Figure 1:
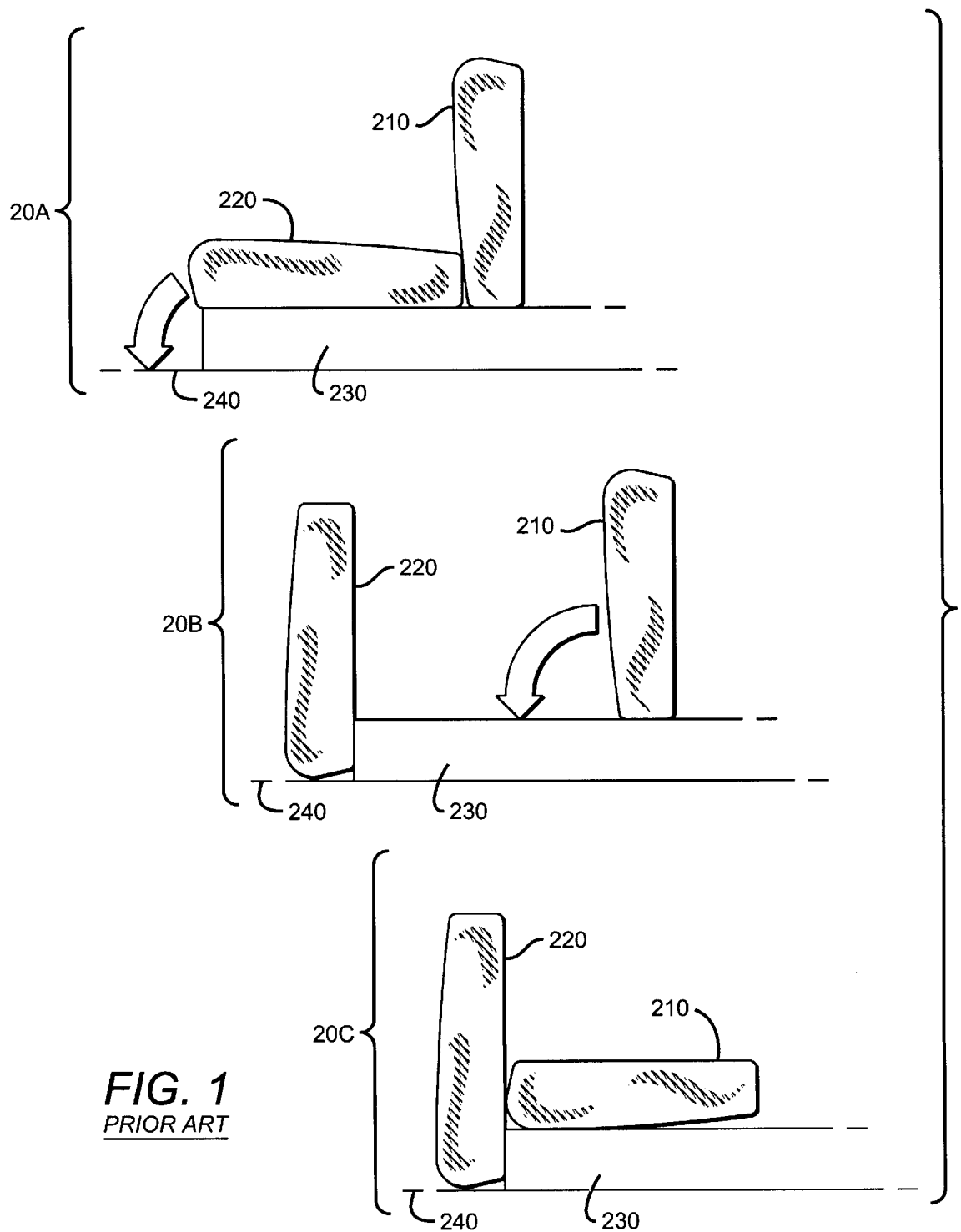
FIG. 1 is a prior art sequence of schematics depicting folding of a seat and a seatback in an automotive vehicle.
Figure 2:
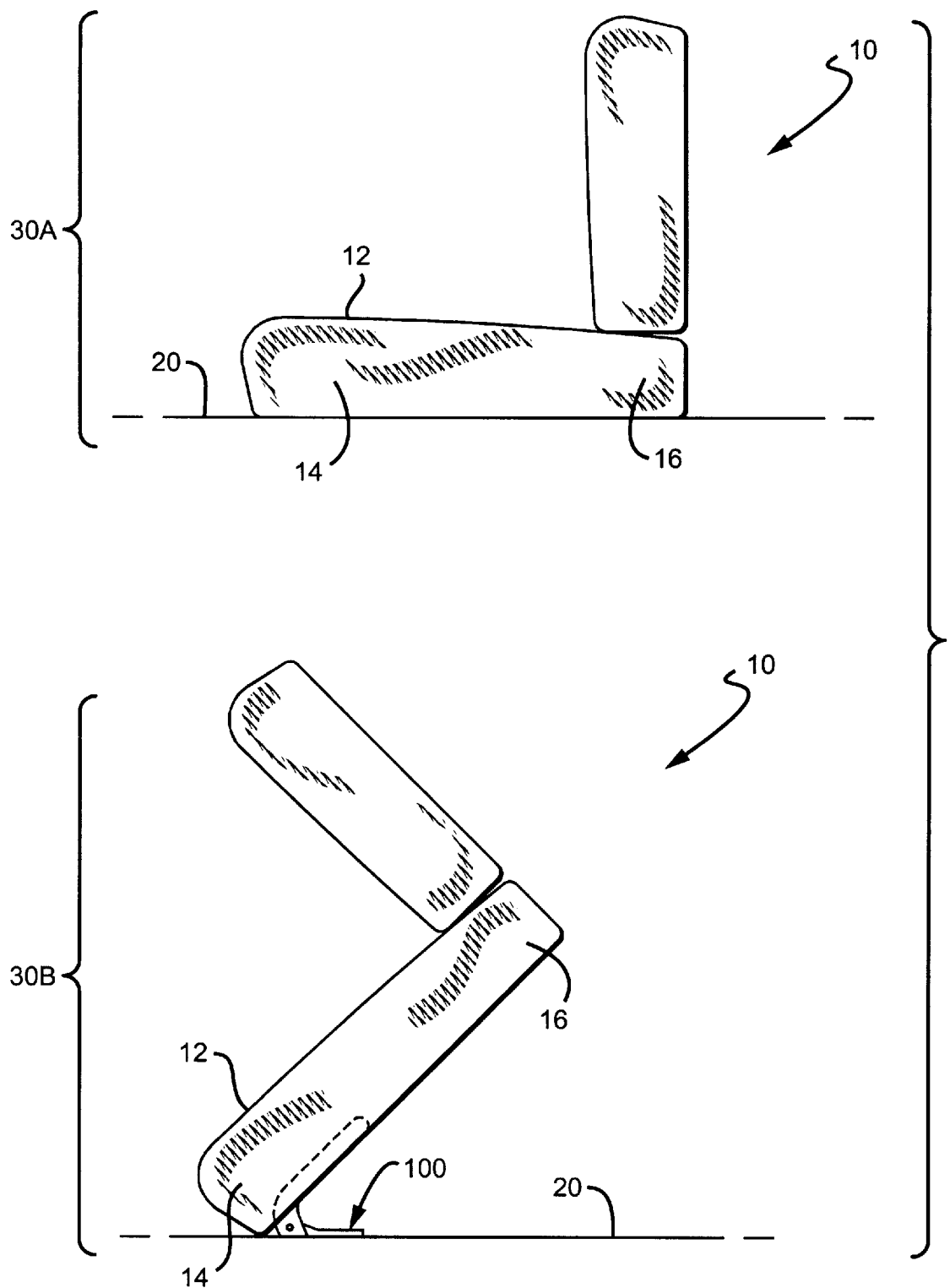
FIG. 2 is a side view of a seat being stowed with the aid of a bracket according to one aspect of the inventive subject matter.

In FIG. 2, the bottom portion 12 of a seat 10 is maintained in a tilted position with respect to floor 20 by bracket 100 such that the front 14 of the bottom portion 12 is substantially lower than the back 16. In frame 3, the bracket 100 generally includes a floor brace 110, a support arm 120, a connecting arm 130, a position securing apparatus 140, and a floor coupling member 150.

The seat 10 and floor 20 may be contained in a car, truck, van, sports utility vehicle, boat, plane, or any other suitable vehicle. Especially preferred vehicles are wheeled vehicles, and the most preferred vehicles are the Ford™ Expedition™ and the Lincoln™ Navigator™. To simplify the drawing and maintain generality in this application, however, only seat 12 and floor 20 of the vehicle are shown.

Seat 10 is contemplated to be any seat having a unitary configuration, where the seat cushion portion 12 and the backrest portion (not shown) are mechanically coupled to one another more or less directly, i.e., other than through the frame, floor, walls, or other portion of the vehicle. Although the coupling likely involves hinging the seat cushion portion 12 and the backrest portion together, other contemplated couplings include fixed relationships obtained by bolting, welding, riveting, uni-frame construction, post and slot connection, and so forth.

Figure 4:
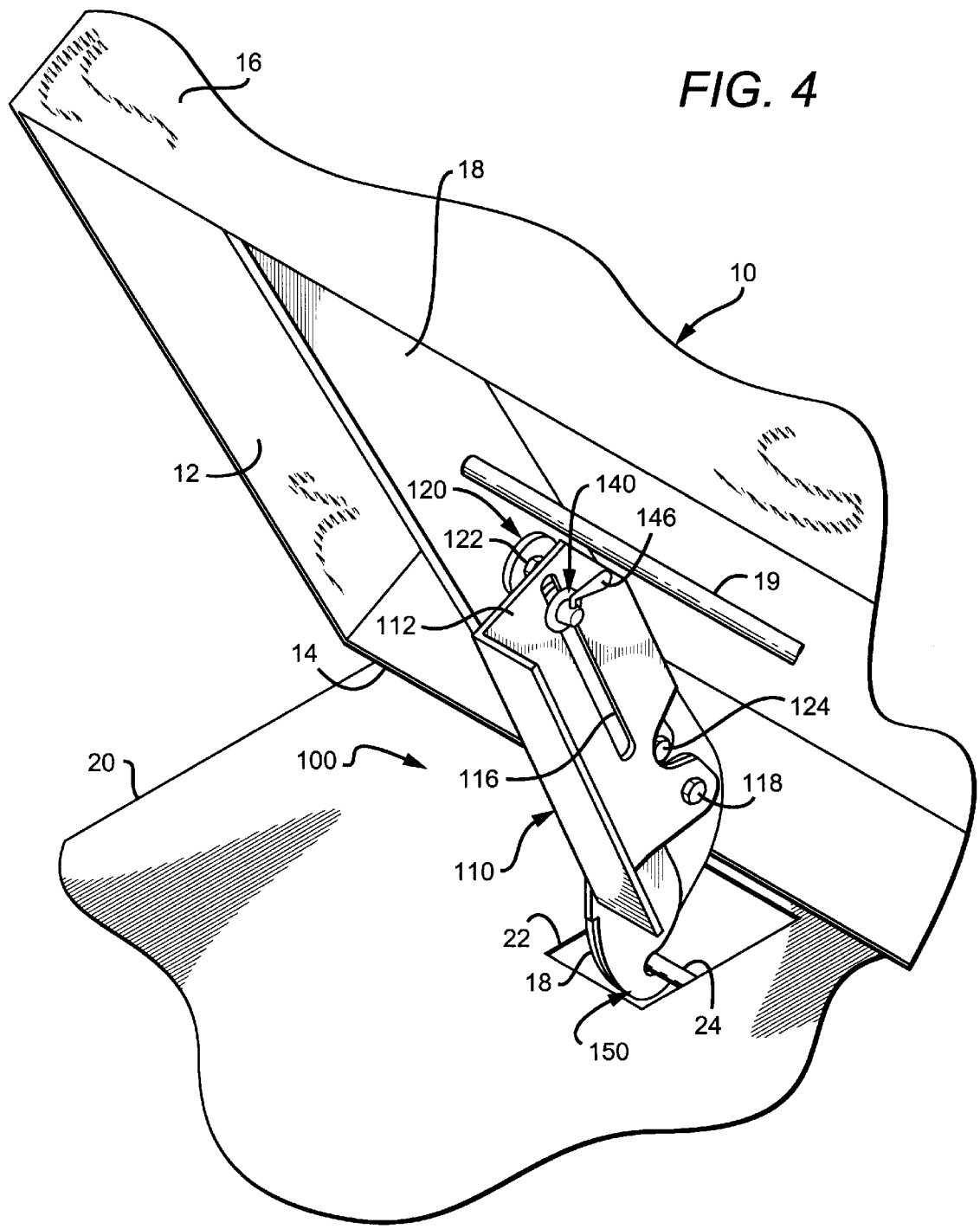
FIG. 4 is a perspective view of the bracket of FIG. 2, locked in the riding position, but with the seat held in the stowed position before being lowered into the riding position.

Both the Ford™ Expedition™ or the Lincoln™ Navigator™ have a seat support 18, the upper end of which is bolted to the bottom portion 12 of seat 10, and the lower end of which pivots about a floor attaching member such as floor pin 24 (see FIG. 4) located in floor cavity 22 (see FIG. 4). Seats 10 in these vehicles are also equipped with a connection bar 19 used to lock the rear of bottom portion 12 to the floor 20.

In the stowed position of FIG. 2, the bottom portion 12 of seat 10 is preferably held at an angle of between 70°–85° away from horizontal. It is also preferred that the front 14 of the bottom portion 12 is held between about three inches and about 12 inches off the floor 20. Neither the preferred stowage angle nor the preferred stowage height are critical, however, and all other suitable other angles and stowage heights are contemplated as well.

Floor brace 110 preferably has a vertical portion 112 and a horizontal portion 114, which preferably comprise a single piece of steel bent at a right angle. A slot 116 is cut or otherwise formed in the vertical portion 112, and receives a bolt, pin, or other member 142 of position securing apparatus 140. Floor brace 110 also receives a bolt 118 or other pivoting member that passes through an opening 113 (shown in FIG. 6) on floor brace 110 and either opening opening 125 or 127 (shown in FIG. 6) on the support arm 120 and the floor coupling member 150 as shown.

In this manner the support arm 120 pivots with respect to the floor brace 110 about a pivot passing through bolt 118. It is preferred that the pivot be positioned no more than 12 inches away from the closest point on the seat 12, more preferably less than 6 inches away, and still more preferably less than 3 inches away.

Figure 6:
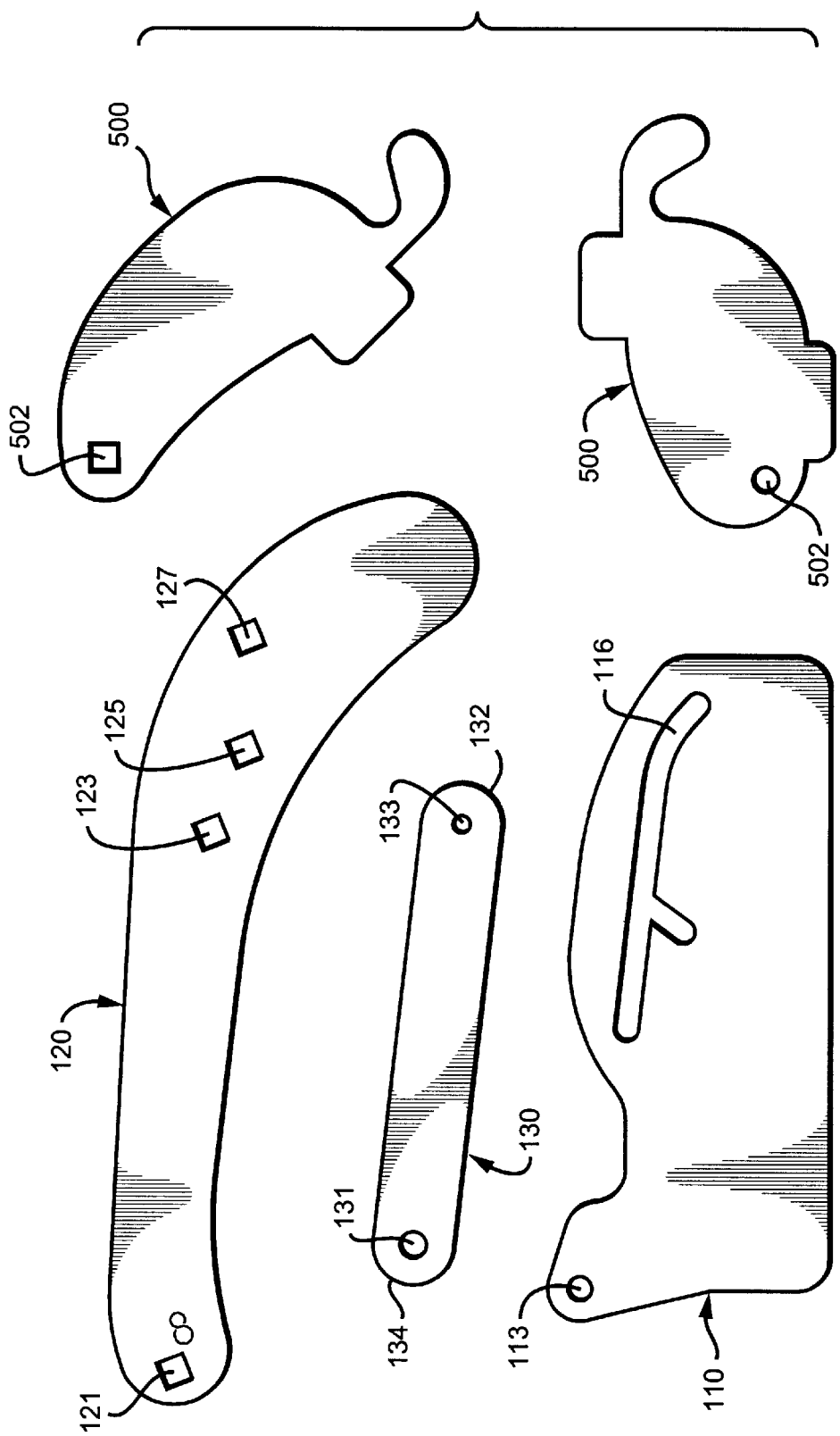
FIG. 6 is a collection of some of the parts used to assemble the preferred embodiments in FIGS. 2–5.

At its upper end support arm 120 is coupled to the seat support 18 at carriage bolt 122 through opening 121 (shown in FIG. 6). At its lower end support arm 120 is coupled to the forward end 132 of connecting arm 130 at pivot 124 through opening 133 (shown in FIG. 6) in the connecting arm 130 and opening 123 (shown in FIG. 6) in support arm 120.

Figure 3:
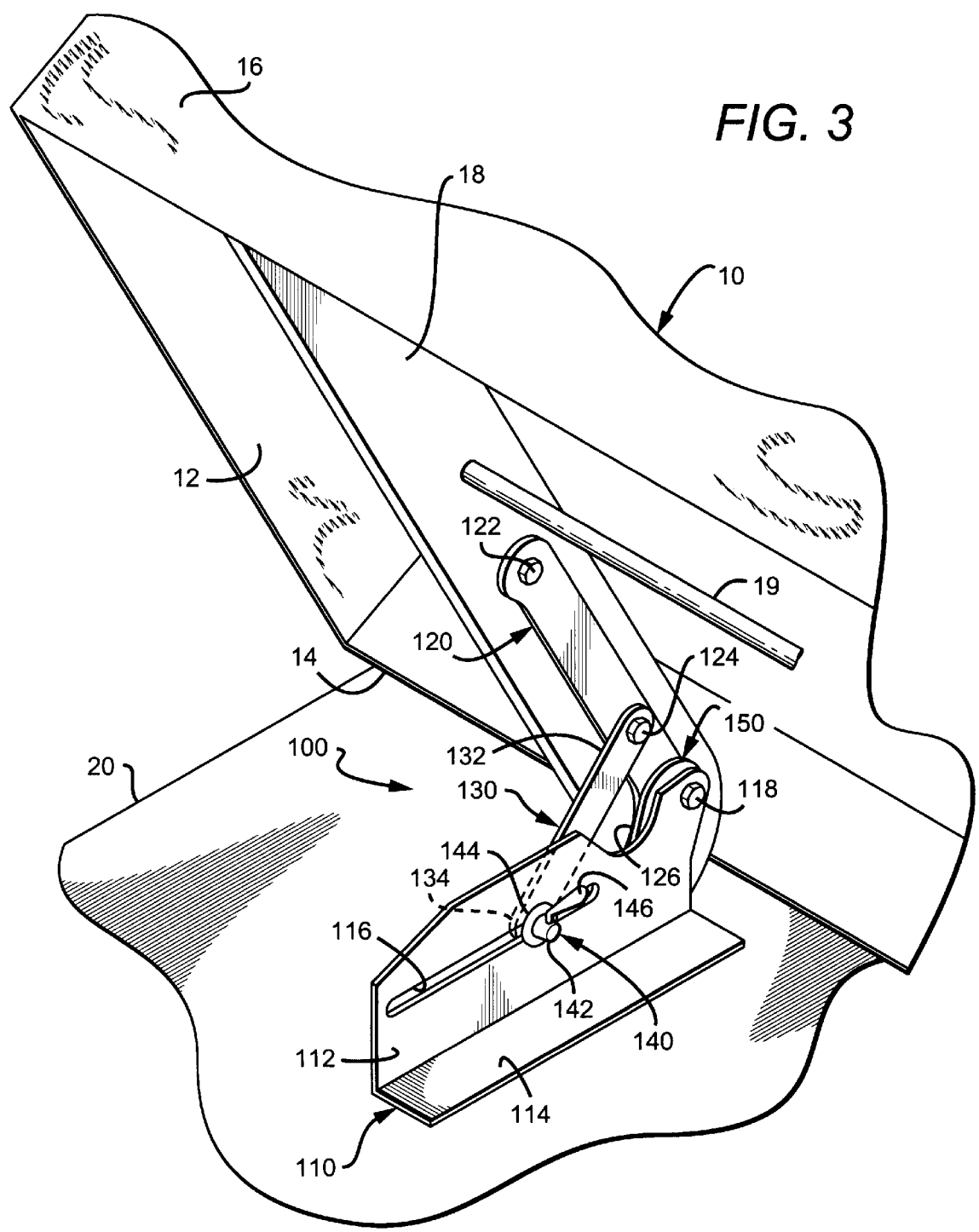
FIG. 3 is a perspective view of the bracket and seat of FIG. 2, locked in the stowed position.

The rearward end 134 of connecting arm 130 is stabilized relative to floor brace 110 in any suitable manner, although it is preferred that the stabilization is accomplished by a digitally operable (i.e., finger operable) couple, such as a pin, thumb screw, wing nut, or levered set screw. It is also preferred that the coupling take place between the digitally operable couple and openings 131 and 133 (shown in FIG. 6) in connecting arm 130. In FIG. 3 140 is utilized, which includes a pin 142, a washer 144, and a levered arm 146, operatively coupled in any suitable manner to compress the connecting arm 130 against the vertical portion 112 of the floor brace 110 at the slot 116. As will be readily appreciated the levered set screw mechanism 140 can be operated to secure the connecting arm 130 to the vertical portion 112 of the floor brace 110 at substantially any desired position in slot 116.

Floor coupling member 150 pivots about bolt 118 at its upper end, and latches onto floor pin 24 (see FIG. 4) using a catch (not shown) at its lower end. The opening of the catch faces frontward, so that when the floor brace 10 is resting upon the floor 20 as in FIG. 3, the lip 126 on support arm 120 pushes the catch forward about the floor pin 24. Seat support 18 also contains a catch, which cooperates with the catch of floor coupling member 150 to lock the seat bottom 12 onto the floor pin 24 when the seat 10 is stowed as in FIG. 3.

In FIG. 4, the levered set screw mechanism 140 has been loosened, the floor brace 110 has been raised to a riding position, the levered set screw mechanism 140 retightened to maintain the position of the floor brace 110 relative to the support arm 120. The seat 10 can now be lowered into a riding position. Alternatively, since the catch of floor coupling member 150 is no longer urged against floor pin 24, the floor coupling member can be pivoted about bolt 118 away from floor pin 24, so that the seat 10 can be entirely decoupled from the floor 20, and removed from the vehicle.

Figure 5:
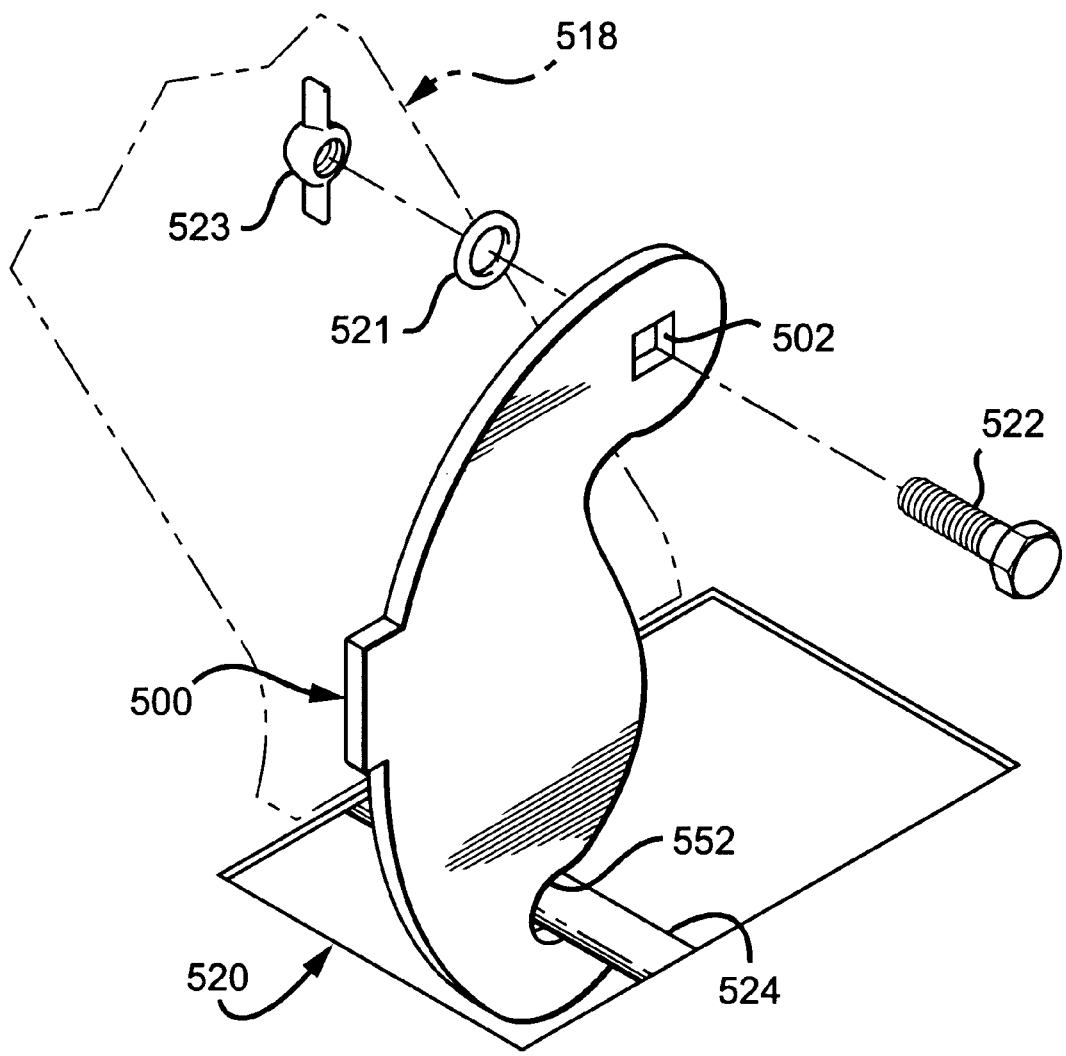
FIG. 5 is a perspective view of a second bracket positioned laterally to the bracket.

In FIG. 5 the seat (not shown) has a second seat support 518, and the floor includes a second floor cavity 520 having a floor pin 524 which may or may not be continuous with floor pin 24 of FIG. 4. Here, a second bracket 500 is bolted at its upper end to the second seat support 518 through opening 502 using a washer 521, a bolt 522 and a nut 523, and slidably couples onto floor pin 524 using catch 552. It should be appreciated that while FIG. 5 depicts the catch 552 as being open to the rear of the vehicle, the opening could face frontwards as appropriate.

From the above description it should be appreciated that the various components of bracket 100 can be manufactured from any suitable material, and can have any suitable It should also be appreciated that many other mechanisms could be utilized to maintain a unitary seat in a stowed, forward tilted position. For example, instead of utilizing opposing catches on the seat support 18 and floor coupling member 150 to lock the seat bottom 12 onto the floor pin 24, a system could be devised that utilizes two opposing floor coupling members. Moreover, one need not use a simple finger type catch as is employed in the Ford™ Expedition™ or the Lincoln™ Navigator™, but could instead utilize more complicated types of catches. Still further, some vehicles may not provide a floor pin at all, and in those instances other suitable methods and apparatus could be utilized to reversibly lock the seat bottom in a tilted, stowed position.

Thus, specific embodiments and applications of methods and apparatus for maintaining a vehicle seat in a stowed position have been disclosed, as well as components for other applications. It should be apparent, however, to those skilled in the art that many more modifications besides those already described are possible without departing from the inventive concepts herein. The inventive subject matter, therefore, is not to be restricted except in the spirit of the appended claims.

I claim:

1. In a motor vehicle having a unitary seat and a floor, the seat removable by hand from the vehicle, and movable to a stowed a position in which the rear of the seat is tilted upwards and the front of the seat is tilted downwards a method of maintaining the seat in the stowed position comprising:

providing a bracket having a support arm and a floor brace pivotally coupled with respect to one another at a pivot, the support arm coupled to the seat;

positioning the bracket such that the pivot is no more than 12 inches from a closest point on the seat, and providing the floor with a floor attaching member, and releasably coupling the bracket to the floor coupling member.

2. The method of claim 1 wherein the support arm and the floor brace are releasably secured to each other using a levered set screw.

3. The method of claim 1 wherein the floor brace rests upon the floor.

4. The method of claim 1 wherein the support arm is coupled to the floor brace at both the pivot and via a connecting arm.

5. The method of claim 4 wherein the floor brace has a slot, and the connecting arm is coupled to the floor brace using a slidable connecting member positioned in the slot.

6. The method of claim 1 wherein the floor coupling member comprises a pin positioned in a cavity in the floor.

7. The method of claim 1 wherein the vehicle is selected from the group consisting of a vehicle wherein the seat is designed to be physically removed from the vehicle.

8. The method of claim 7 wherein the vehicle comprises a vehicle wherein the seat is designed to be physically removed from the vehicle, the floor brace has a slot, and the support arm and the floor brace are releasably coupled to each other via a connecting arm and a slidable connecting member positioned in the slot.

9. The method of claim 8 further comprising using a levered set screw to releasably couple the support arm and the floor brace.

10. A seat bracket in combination with a motor vehicle having a unitary seat and a floor, the seat removable by hand from the vehicle, and movable to a stowed a position in which the rear of the seat is tilted upwards and the front of the seat is tilted downwards, comprising:

a support arm and a floor brace pivotally coupled with respect to one another at a pivot;

the support arm coupled to the seat;

the pivot positioned no more than 12 inches from a closest point on the seat; and a position securing apparatus that releasably couples the bracket to a floor coupling member.

11. The bracket of claim 10 wherein the vehicle is selected from the group consisting of a vehicle wherein the seat is designed to be physically removed from the vehicle.

12. The bracket of claim 11 wherein the floor brace has a slot, and the support arm and the floor brace are releasably coupled to each other via a connecting arm and a slidable connecting member positioned in the slot.

13. The method of claim 12 further comprising using a levered set screw that releasably couples the support arm and the floor brace.

* * * * *